FIG. I

A COMPLEX COMPOUND OF WERNER TYPE IN WHICH A TRIVALENT NUCLEAR CHROMIUM ATOM IS COORDINATED WITH AN ACETATO-CONTAINING RADICAL SELECTED FROM THE GROUP CONSISTING OF TRICHLOROACETATO, TRIFLUOROACETATO AND CYANOACETATO RADICALS.

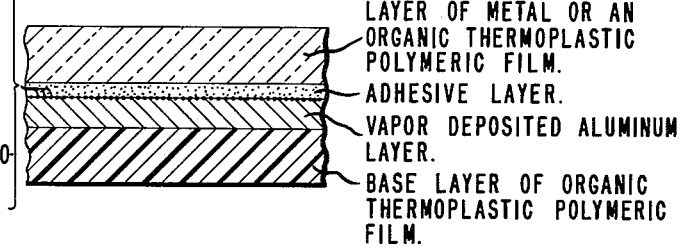

LAYER OF METAL OR AN ORGANIC THERMOPLASTIC POLYMERIC FILM.
ADHESIVE LAYER.
VAPOR DEPOSITED ALUMINUM LAYER.
BASE LAYER OF ORGANIC THERMOPLASTIC POLYMERIC FILM.

FIG. 2

A COMPLEX COMPOUND OF WERNER TYPE IN WHICH A TRIVALENT NUCLEAR CHROMIUM ATOM IS COORDINATED WITH AN ACETATO-CONTAINING RADICAL SELECTED FROM THE GROUP CONSISTING OF TRICHLOROACETATO, TRIFLUOROACETATO AND CYANOACETATO RADICALS.

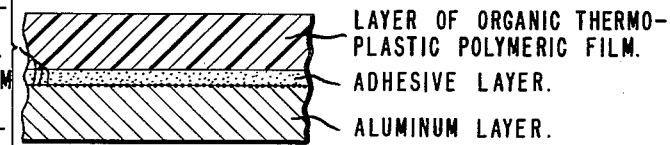

LAYER OF ORGANIC THERMOPLASTIC POLYMERIC FILM.
ADHESIVE LAYER.
ALUMINUM LAYER.

INVENTORS
LEONARD EDWARD AMBORSKI
CHARLES JOSEPH MIGHTON

BY Herbert M. Wolfson
ATTORNEY

United States Patent Office 3,107,198
Patented Oct. 15, 1963

3,107,198
LAMINATES PREPARED WITH WERNER COMPLEX COATING ON AN ALUMINUM LAYER
Leonard Edward Amborski, Buffalo, N.Y., and Charles Joseph Mighton, Wilmington, Del., assignors to E. I. du Pont de Nemours and Company, Wilmington, Del., a corporation of Delaware
Filed Dec. 22, 1959, Ser. No. 861,196
24 Claims. (Cl. 161—213)

This invention relates to the preparation of laminates and, more particularly, to such laminates wherein an aluminum layer is adhered to at least one layer of a polymeric film or to a metal sheet.

Self-supporting polymeric films in combination with thin layers of aluminum in the form of laminates have found widespread employment in both decorative and functional applications. The aluminum may be used in the form of a relatively thin self-supporting foil or as a thin non-self-supporting layer deposited as a vapor in vacuo or by a coating or dipping process.

Polymer to aluminum laminates may be cut appropriately and used in the manufacture of metallic yarns, one of the methods by which the textile industry provides decorative effects in fabrics. In the household appliance field and in the automobile industry there is a demand for vacuum metalized polymeric films as a replacement for expensive metal plated surfaces. Thus, vapor deposited coatings of aluminum may be used to simulate the appearance of surfaces that have been chromium plated or of surfaces of stainless steel. Furthermore, as the use of aluminized steel for construction has increased, the demand for using transparent polymeric films over aluminized surfaces to impart color has also increased. In this particular application, the color may be produced by pigmentation of the film itself or by pigmentation of the adhesive used to secure the film to the aluminum surface.

Despite the versatility of aluminum-polymeric film laminates, their use has been severely limited. The aluminum component of such laminates gradually disappears upon exposure to moisture. Even average relative humidities cause the metal to disappear after prolonged exposure. For example, in a laminate of aluminized polyethylene terephthalate film adhesively secured to a steel substrate and used as decorative trim on a household appliance, the aluminum layer between the film and the steel substrate tends to disappear gradually over a period of several months. In a laminate of an aluminized polyvinyl fluoride film adhesively secured to a steel substrate and subsequently formed into an automobile hub cap, the intermediate aluminum component tends to disappear completely after only a few washings with a steam hose. In a laminated metallic yarn wherein aluminum is sandwiched between layers of cellulose ester film or polyester film, the aluminum component tends to disappear upon immersion of the yarn in the dilute caustic commonly employed for vat dyeing.

The primary object of the present invention is to alter the above situation, i.e., to form a long-lasting laminate wherein a thin layer of aluminum is at least one component of the laminate. Another object is to form a laminate wherein the aluminum does not gradually disappear and in which the adherence between components of the laminate persists for long periods of time. Other objects will appear hereinafter.

The objects are accomplished by treating the aluminum layer, either in the form of a foil or as a metalized stratum deposited as a vapor or from a chemical bath on a base stratum selected from the group consisting of a metal and a polymeric film, with a complex compound of the Werner type in which a trivalent nuclear chromium atom is coordinated with an acetato-containing radical selected from the group consisting of trichloroacetato, trifluoroacetato and cyanoacetato radicals, preferably cyanoacetato, prior to completing formation of the laminate by adhering the aluminium layer to a chemically dissimilar metal sheet or polymeric film, hereinafter called the laminating stratum.

The preferred process involves treating an aluminum layer with the chromium coordination complex of basic chromic chloride and an acid selected from the group consisting of cyanoacetic acid, trifluoroacetic acid and trichloroacetic acid; applying an adhesive selected from the group consisting of polyester, vinyl chloride/vinyl acetate, acrylic copolymer, and epoxy resin adhesives to the surface of the aluminum layer; and applying a top stratum of a polymeric film selected from the group consisting of polyethylene terephthalate film and polyvinyl fluoride film over the adhesive to form a laminated structure.

One typical product of the invention, therefore, is a laminate comprising the combination of at least three layers, as follows: a thin aluminum layer, an adhesive layer over the aluminum and a polymeric film over the adhesive, the surface of the aluminum layer adjacent the adhesive layer having adsorbed thereon a complex compound of the Werner type in which a trivalent nuclear chromium atom is coordinated with an acetato radical selected from the group consisting of trichloroacetato, trifluoroacetato and cyanoacetato radicals. This product is illustrated in the drawing; FIGURE 1 showing a separate aluminum layer and FIGURE 2 showing a vapor deposited aluminum layer.

The invention is applicable to the preparation of laminates containing a variety of polymeric films. Polyethylene terephthalate films and polyvinyl fluoride films are particularly useful as top strata since they are, or can be made, resistant to outdoor weathering conditions. However, other organic polymeric thermoplastic materials in the form of films may be used in the present invention. These include cellulose ester films (films of cellulose acetate, cellulose butyrate, cellulose propionate, copolymers of the cellulose esters, etc.), vinyl films (films of homopolymers and copolymers of acrylonitrile, the vinyl halides such as vinyl chloride, the vinylidene halides such as vinylidene chloride and vinylidene fluoride, vinyl esters such as vinyl acetate), films of ethylenic polymers (films of homopolymers and copolymers of ethylene, propylene, isobutylene, styrene, tetrafluoroethylene), polyamide films, etc.

The aluminum may be in the form of a foil, preferably no thicker than 0.005", or a deposited layer. Deposition of the aluminum on an organic polymeric thermoplastic film may be accomplished by using aluminum in the vapor state under a vacuum in accordance with any of several commercial techniques described in "Vacuum Deposition of Thin Films," L. Holland (John Wiley and Sons, 1956), or "High Vacuum Technique," J. Yarwood (John Wiley & Sons, 1955). Various hot dip and rolling techniques for aluminizing ferrous and other base metals are described in U.S. Patent Nos. 2,437,919, 2,697,869, 2,774,686 and in Canadian Patent No. 454,951.

In the critical step of the invention, the aluminum, either in the form of a thin foil or as a deposited layer on a base stratum, is treated with an aqueous solution of the chrome complex, the solution being maintained at a pH of 4.0 to 7.0. The chrome complex is selected from the group consisting of cyanoacetato chromic chloride, trichloroacetato chromic chloride and trifluoroacetato chromic chloride.

There are several ways of preparing these chrome complexes. Briefly, the process consists of reacting the basic chromic chloride with a carboxylic acid selected from the group consisting of cyanoacetic, trichloroacetic and trifluoroacetic acids to form the chromium complex. U.S. Patent No. 2,683,156 describes a process for producing the basic chromic chloride and, in turn, producing the chrome complexes from the basic chromic chloride. This process for the production of basic chromic chloride comprises injecting anhydrous chromyl chloride, $CrO_2Cl_2$, formed by bubbling anhydrous hydrogen chloride into a sulfuric acid solution of chromic oxide, $CrO_3$, into an aliphatic alcohol, such as isopropanol to form the basic chromic chloride, $Cr(OH)Cl_2$. Thereafter, the basic chromic chloride is reacted with the appropriate acid to form the chrome complex.

The aqueous solution of the chrome complex even at high dilutions is highly acid. For example, when 2 grams of a 30% solution of the cyanoacetato chromic chloride in isopropanol is added to 98 grams of distilled deionized water, the resulting solution exhibits a pH in the range of 2.8 to 3.1. It has been found necessary for the purpose of the present invention to adjust the pH of the solution upward before employing the solution to treat the aluminum surface. The operable range of pH for use in the present invention is 4.0 to 7.0. However, it is preferred to maintain the pH between 4.3 and 6.7. The lower limit on the pH range seems to be determined by the reactivity of aluminum in the acid solution. The upper limit on the pH range is determined by the stability of the chrome complex. Among the agents which have been found suitable for adjusting the pH of the aqueous chrome complex solutions are melamine, urea, a very dilute aqueous solution of ammonia (about 1%), hexamethylenetetramine, pyridine and piperidine.

The required time of exposure of the aluminum to the chrome complex solution will depend upon several factors. The particular chrome complex used, the concentration of the chrome complex in its solution, the pH of the solution, the temperature of the solution during treatment, the thickness of the aluminum layer, etc., all will affect the proper exposure time. The time must be less than that which would result in etching away the aluminum layer to any substantial degree. In general, a vapor deposited aluminum layer, being thin, will be dissolved away to an objectionable degree in considerably less time than will an aluminum foil or the aluminum layer of an aluminized steel. The exposure time should be sufficient for the aluminum to adsorb an adequate amount of the chrome complex to provide protection against moisture and the like. Ordinarily, a time of at least five seconds will provide some improvement in this property. The preferred duration of treatment for any particular set of conditions of solution and of aluminum will fall between 30 seconds and about 5 minutes.

In the next step, the treated aluminum is dried by driving off excess water in the usual manner (by heating or by lowering pressure or by passing air over the surface, etc.). The dried, treated aluminum layer may then be washed with water to remove any soluble salts (the adsorbed chrome complex will not wash off with water) and then dried again.

Preparatory to forming the laminate, an adhesive may be applied to the aluminum layer or to the surface of the stratum which will overlie the aluminum layer. Many common adhesives are operable in the present invention. However, adhesives based on polyesters, butadiene/acrylonitrile copolymers, vinyl chloride/vinyl acetate copolymers, methyl methacrylate/glycidyl methacrylate copolymers and epoxy resins are preferred. Among the polyester based adhesives which may be used in this invention are those copolyesters obtained by reacting a slight stoichiometric excess of ethylene glycol with a mixture of the dimethyl esters of:

(1) Terephthalic and sebacic acids, such as are described in U.S. Patents 2,623,033 and 2,698,239;
(2) Terephthalic, isophthalic and sebacic acids, such as are described in U.S. Patents 2,698,239 and 2,698,241;
(3) Terephthalic, isophthalic, sebacic and adipic acids, such as are described in copending U.S. Patent Application Serial No. 618,457, filed October 26, 1956 in the name of John I. Dye and assigned to the assignee of the present application; and
(4) Terephthalic and adipic acids, such as are described in U.S. Patent 2,698,239.

Among the butadiene/acrylonitrile copolymer based adhesives which may be used in this invention are the butadiene/acrylonitrile copolymers described in U.S. Patent 2,405,038. These include copolymers available under the trade names "Hycar" OR [1], "Chemigum" [2], "Butaprene" [3] and "Perbunan" [4].

Among the vinyl chloride/vinyl acetate copolymer based adhesives which may be used in this invention are those available from Swift & Company, General Adhesives Product Dept., Chicago, Illinois.

Among the epoxy resin based adhesives which may be used in this invention are those available from Armstrong Products Company, Warsaw, Indiana; Raybestos-Manhattan Corporation, Bridgeport, Connecticut; and H. B. Fuller Co., St. Paul, Minnesota.

After applying the adhesive to the aluminum, the laminating stratum of a polymeric film or a metal other than aluminum is placed over the adhesive. The laminate, thus formed, is then usually heated under pressure in a manner well known to those in the art. The polymeric films may be any of those discussed previously. The metals include, besides the preferred iron and steel, zinc, nickel, tin and copper. The resulting laminates may be used wherever the metals themselves have been used before, particularly for household appliance exteriors, in the exteriors of automobiles and in building exteriors.

The most surprising aspect of this invention lies in the particular chrome complexes that must be used for a successful treatment of the aluminum. For example, the stearato chromic chloride and the perfluorooctanoato chromic chloride do not provide the improvements of the present invention. In fact, it is highly unpredictable as to whether a given chrome complex will operate with, and provide the stabilizing effect on, aluminum without actually testing the complex with aluminum in the laminate setting.

The invention will be more clearly understood by referring to the examples which follow. It should be understood that these examples are merely illustrative and should not be considered limitative of the present invention.

EXAMPLE 1

A slurry of chromic acid, $CrO_3$, in sulfuric acid was prepared by adding 300 parts of chromic acid to 2000 parts of concentrated sulfuric acid with agitation. The mixture was cooled to 30° C. and 230 parts of anhydrous hydrogen chloride was bubbled into the mixture beneath the surface. The temperature of the reaction mixture was kept below 50° C. by external cooling. Chlorine gas produced as a by-product was vented.

After the reaction was completed, the mixture consisted of two layers, the bottom layer being the anhydrous chromyl chloride. This heavier layer was separated by decantation. 448 parts of chromyl chloride was obtained.

The 448 parts of anhydrous chromyl chloride prepared as described above was slowly added beneath the surface of 1200 parts of refluxing isopropanol. In this step the chromyl chloride was reduced to basic chromic chloride, $Cr(OH)Cl_2$, in a period of about one hour. 350 parts of water was then added to the mixture through the chromyl chloride feed tube. Analysis of the basic chromic chlo-

---

[1] Available from B. F. Goodrich Chemical Co., Cleveland, Ohio.
[2] Available from Goodyear Tire & Rubber Co., Akron, Ohio.
[3] Available from The Firestone Tire & Rubber Co., Akron, Ohio.
[4] Available from Stanco Distributors, Inc., New York, N.Y.

ride prepared above gave a chromium content of 7.50% and a chloride content of 10.21%.

The chrome complex of cyanoacetic acid, cyanoacetato chromic chloride, is prepared by first adding 139 parts of the basic chromic chloride to a flask and then adding 26 parts of water. Next, 8.5 parts of cyanoacetic acid was added and the mixture was refluxed for 15 minutes and then cooled to room temperature. Analysis showed a chromium content of 5.96%. The chromium to carboxylic acid mole ratio used in this preparation was 2:1.

A solution was prepared by adding 2 grams of a 30% solution of the cyanoacetato chromic chloride complex in isopropanol prepared above to 98 grams of water, followed by small additions of melamine until the pH of the solution was 4.3. A sheet of aluminum foil 0.5-mil thick was immersed for one minute in the solution. On removal from the solution, the foil was allowed to drain and then was dried for five minutes in a circulating air oven at 105° C. Next, the aluminum foil was dipwashed in distilled water and again dried for five minutes at 105° C. A 5-mil thick layer of a polyester/isocyanate adhesive was applied to each side of the foil and the solvent evaporated from the adhesive in a current of heated air.

The adhesive had been prepared by mixing together 2.5 grams of an isocyanate curing agent and 100 grams of a 15% solution in 1,1,2-trichloroethane of a polyester made by reacting ethylene glycol (in slight stoichiometric excess) with a mixture of the dimethyl esters of terephthalic and sebacic acids (55 and 45 mole percent, respectively). The curing agent was a 60 percent solution in methyl isobutyl ketone of the adduct formed by reacting 5 moles of an isomeric mixture comprising about 80 mole percent of 2,4-toluenediisocyanate and about 20 mole percent of 2,6-toluenediisocyanate with 2 moles of trimethylolpropane.

The adhesive coated foil was sandwiched between two 0.5 mil thick sheets of a polyethylene terephthalate film and a lamination was produced by heating this sandwich in a platen press for 20 minutes at 170° C., under a pressure of 300–400 p.s.i.

As a control, a lamination was prepared in an identical manner to that described for Example 1 except that the aluminum foil was not dipped in the cyanoacetato chromic chloride solution prior to laminating.

The laminations were slit into strips approximately 1/32 inch wide, i.e., in the width range for metallic yarns. The strips were immersed for 45 minutes in a 1.5 percent aqueous solution of sodium hydroxide maintained at 130° F. On removal from the caustic solution, loss of aluminum from the strips wherein the aluminum component had been treated with the cyanoacetato chromic chloride complex was barely perceptible and the laminations were still intact.

On the other hand, all of the aluminum had disappeared from the control strips and hydrogen evolution, noticed during immersion in the caustic solution, had resulted in virtually complete delamination of the strips.

EXAMPLES 2–4

In Example 2, a 0.5-mil thick sheet of a polyethylene terephthalate film, vapor metalized on one side with aluminum, was treated with the cyanoacetato chromic chloride solution as in Example 1. The aluminum side was then coated with a layer of the polyester/isocyanate adhesive described in Example 1 and the aluminized sheet was laminated to a 1-mil thick sheet of a polyethylene terephthalate film by heating in a platen press as in Example 1.

In Example 3, a 0.5-mil thick sheet of a polyethylene terephthalate film, vapor metalized on both sides with aluminum, was treated with the cyanoacetato chromic chloride solution as in Example 1. Both aluminum surfaces were then coated with a layer of the polyester/isocyanate adhesive described in Example 1. The adhesive coated, metalized polyethylene terephthalate film was laminated between two 0.5-mil thick layers of the same polyethylene terephthalate film by heating in a platen press as in Example 1.

In Example 4, a 0.5-mil thick sheet of a polyethylene terephthalate film, vapor metalized on one side with aluminum, was treated with the cyanoacetato chromic chloride solution as in Example 1. The aluminum side was then coated with a layer of an adhesive consisting of a 28 percent solution in methyl ethyl ketone of a mixture of approximately two parts by weight of "Hycar" OR-15 [1] with one part by weight of a phenol-formaldehyde resin.

After evaporating the solvent from this adhesive in a current of heated air, the adhesive surface was pressed against a 1-mil thick sheet of the same polyethylene terephthalate film and the resulting lamination heated in a platen press for 15 seconds at approximately 150° C. and under a pressure of about 200 p.s.i.

Control laminations were made following the procedures indicated in Examples 2–4 above, except that the aluminum surfaces were not treated with the cyanoacetato chromic chloride solution.

All six laminations were slit into strips ranging between 1/64 inch and 1/32 inch and subjected to the hot caustic immersion described in Example 1. At the end of this immersion, essentially the same striking contrast as in Example 1 was noted between the degree of aluminum loss from control strips and from those treated with the cyanoacetato chromic chloride solution.

EXAMPLE 5

A sheet of polyvinyl fluoride film 2 mils thick, having on one surface a vapor deposited layer of aluminum, was cut into two pieces, one of which was subjected to the treatment with the cyanoacetato chromic chloride solution as in Example 1 for the aluminum foil. The aluminum surfaces of both pieces of film were coated with a 10-mil thick layer of a 15 percent solution in 1,1,2-trichloroethane of the polyester described in Example 1, and the solvent volatilized from these coatings in a current of heated air. Both adhesive coated samples were immersed in tap water having a pH of 7.9, an alkalinity of 85.5 parts per million and a sodium chloride content of 44.5 parts per million.

After 318 hours of immersion, the sample treated with the cyanoacetato chromic chloride solution showed no loss of aluminum while approximately 50% of the aluminum had disappeared from the untreated control. After 798 hours, the treated sample showed a loss of about 5% of the aluminum while all of the aluminum had disappeared from the control. After more than 3000 hours immersion, the treated samples still showed no more than 5 percent aluminum loss. During this test, the temperature of the tap water ranged from 26° C. to 30° C.

EXAMPLES 6–8

In these examples, polyvinyl fluoride film metalized with aluminum as in Example 5 was treated by immersion for one minute in the following three solutions, all of which had been buffered to a pH of 4.3 with melamine:

Example 6—the cyanoacetato chromic chloride prepared as in Example 1.

Example 7—a trichloroacetato chromic chloride prepared as described below.

Example 8—a trifluoroacetato chromic chloride prepared as described below.

The chrome complex of trichloroacetic acid, trichloroacetato chromic chloride, was prepared by adding

---

[1] A butadiene/acrylonitrile copolymer manufactured by B. F. Goodrich Chemical Company, Cleveland, Ohio, containing about 60 percent by weight of butadiene and about 40 percent by weight of acrylonitrile.

70.0 parts of the basic chromic chloride prepared as in Example 1 and 9.0 parts of water to a flask. To this solution was added 8.15 parts of trichloroacetic acid. The mixture was refluxed for 15 minutes and cooled to room temperature. A chromium analysis showed a content of 6.02% chromium.

The chrome complex of trifluoroacetic acid, trifluoroacetato chromic chloride, was prepared by adding 122 parts of the basic chromic chloride prepared as in Example 1 and 20 parts of water to a flask. 10 parts of trifluoroacetic acid was slowly added to this mixture due to the high heat of reaction. When all the trifluoroacetic acid had been added, the temperature of the mixture was increased and the mixture was held at reflux for 15 minutes, and then cooled. The resulting chrome complex of trifluoroacetic acid had a chromium content of 6.01%.

The following were used as controls for these examples. Control A involved no treatment. Control B involved a 1-minute treatment in a stearato chromic chloride solution which had been buffered to a pH of 4.3. Control C involved a 1-minute treatment in a perfluorooctanoato chromic chloride solution buffered to a pH of 4.3.

All the materials of Examples 6-8 and controls A, B and C were then immersed in tap water at room temperature. In the following table, Table I, are presented the results in terms of the time required for the aluminized film to lose substantially all of the aluminum layer.

*Table I*

|  | Number of Days Required to Remove Substantially all of the Aluminum Layer |
|---|---|
| Example 6 (cyanoacetato) | 80 |
| Example 7 (trichloroacetato) | 43 |
| Example 8 (trifluoroacetato) | 60 |
| Control A (none) | 1 |
| Control B (stearato) | 3 |
| Control C (perfluorooctanoato) | 1 |

EXAMPLES 9-11

In these examples, the aluminized polyvinyl fluoride films prepared as in Example 5 and treated as in Examples 6, 7 and 8, were covered with a 1.5 mil (dry thickness) layer of a polyester adhesive. The adhesive had been prepared as in Example 1 except that the isocyanate was omitted. As control A, an untreated polyvinyl fluoride film was coated with the adhesive. As control B, an aluminized polyvinyl fluoride film treated with the stearato chromic chloride was coated with the adhesive. As control C, the aluminized polyvinyl fluoride film treated with a perfluorooctanoato chromic chloride was coated with the adhesive.

All the materials were then immersed in tap water at room temperature. In the following table, Table II, are presented the results in terms of the percent aluminum lost after about 50 days of immersion, about 100 days of immersion and about 140 days of immersion.

*Table II*

|  | Percent Loss of Aluminum After 50, 100, and 140 Days | | |
|---|---|---|---|
|  | 50 Days | 100 Days | 140 Days |
| Example 9 (cyanoacetato) | 2 | 20 | 40. |
| Example 10 (trichloroacetato) | 5 | 25 | 80. |
| Example 11 (trifluoroacetato) | 10 | 15 | 20. |
| Control A (none) | 100 | 100 | 100. |
| Control B (stearato) | 25 | 60 | coating fell off. |
| Control C (perfluorooctanoato) | 25 | 45 | Do. |

EXAMPLES 12-13

Samples of polyvinyl fluoride film were metalized on one side with aluminum as in Example 5. In Example 12, samples of the aluminized film were immersed for 30 seconds in a solution of the trifluoroacetato chromic chloride complex prepared as in Example 8 and buffered to a pH of 4.3. In Example 13, samples of the aluminized film were immersed for 30 seconds in a solution of the cyanoacetato chromic chloride complex prepared as in Example 1 and buffered to a pH of 4.3. As control A, no chrome complex treatment was employed. As control B, a solution of a methacrylato chromic chloride complex buffered to a pH of 4.3 was used in a 30-second treatment.

The complex-treated samples were heated to dry them; then were dipped in water to wash off soluble chlorides and then dried again.

A 1.5 mil (dry thickness) layer of the polyester adhesive of Example 1 (but omitting the isocyanate) was applied over the aluminum layer of all the samples. For each example and control, two adhesive-coated film samples were brought together, adhesive-to-adhesive, and combined in a press where they were subjected to a temperature of 120° C. and a pressure of 300 p.s.i. for 5 minutes.

Wet bond strengths were then measured by peeling apart the two layers of polyvinyl fluoride film on a Suter tester 48 hours after the laminates were made. For 24 of the 48 hours, the laminates remained at room conditions and for the remaining 24 hours they were immersed in room temperature tap water. The wet bond strengths were determined while the samples were still wet. Dry bond strengths, determined in a similar manner except for the omission of the water immersion step, were also obtained.

All the results are reported in Table III below.

*Table III*

|  | Peel Bond Strength (grams/inch) | |
|---|---|---|
|  | Dry | Wet |
| Example 12 (trifluoroacetato) | 1,200 | 1,440 |
| Example 13 (cyanoacetato) | 1,050 | 800 |
| Control A (none) | 1,120 | 0 |
| Control B (methacrylato) | 990 | 0 |

EXAMPLES 14-15

Samples of polyvinyl fluoride film were metalized on one side with aluminum as in Example 5. In Examples 14 and 15, samples of the aluminized film were immersed for one minute in a solution of the cyanoacetato chromic chloride complex prepared as in Example 1 and buffered to a pH of 4.3. The complex-treated samples were heated to dry them; then were dipped in water to wash off soluble chlorides and then dried in air. In Example 14, a 1.5 mil (dry thickness) layer of the polyester/isocyanate adhesive of Example 1 was applied over the aluminum layer of the samples. In Example 15, a 1.5 mil (dry thickness) layer of an adhesive consisting of a 30% solution of a vinyl chloride/vinyl acetate copolymer in a mixture of chlorinated solvents was applied over the aluminum layer of the samples.

Aluminized polyvinyl fluoride films which had not been treated with the chrome complex solution were employed as controls. As control A, the aluminum layers of several samples were coated with the polyester based adhesive while for control B samples, the vinyl chloride/vinyly acetate copolymer based adhesive was used.

For each example and control, the adhesive-coated surfaces were laminated to 4" x 6" x 0.025" flat blanks of cold rolled steel by combining in a press where they were subjected to a temperature of 120° C. and a pressure of a 300 p.s.i. for 5 minutes. Prior to combining, the surface of each steel blank to be laminated was coated with a 0.1 mil (dry thickness) layer of Du Pont No. 64-1690 high bake black alkyd sheet metal primer which was dried for 20–30 minutes at a temperature of 175–200° C.

Each film-to-steel lamination was dimpled in several places to a depth of ½" by pressing its film-covered surface against 1" diameter steel balls. The film conformed to the contours of the dimples without breaking.

All of these dimpled laminations were subjected to a 6-month outdoor exposure in Hialeah, Florida, mounted on racks so that their film-covered surfaces faced due south and were slanted 45 degrees to the horizontal. The results of this exposure are reported in Table IV below.

Table IV

|  | After 6-Month Outdoor Exposure at Hialeah, Florida | |
| --- | --- | --- |
|  | Percent Loss of Aluminum | Delamination of Film from Steel |
| Example 14 (cyanoacetato/polyester adhesive) | 0 | None. |
| Control A (polyester adhesive only) | 40 | Extensive. |
| Example 15 (cyanoacetato/VCl/VAc adhesive) | 0 | None. |
| Control B (VCl/VAc adhesive only) | 100 | Complete. |

Having fully described the invention, what is claimed is:

1. A process which comprises treating at least one surface of an aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0.

2. A process as in claim 1 wherein the aluminum layer is in the form of an aluminum foil having a thickness no greater than 0.005".

3. A process as in claim 1 wherein the complex compound is cyanoacetato chromic chloride.

4. A process as in claim 1 wherein the complex compound is trichloroacetato chromic chloride.

5. A process as in claim 1 wherein the complex compound is trifluoroacetato chromic chloride.

6. A process which comprises depositing aluminum vapor on the surface of an organic polymeric thermoplastic film to form an aluminum layer thereon and treating the exposed surface of said aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0.

7. A process as in claim 6 wherein said organic polymeric thermoplastic film is polyvinyl fluoride film.

8. A process as in claim 6 wherein said organic polymeric thermoplastic film is polyethylene terephthalate film.

9. A process which comprises treating at least one surface of an aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0; applying an adhesive to the treated surface of said aluminum layer; and placing an organic polymeric thermoplastic film layer over said adhesive to form a laminate.

10. A process which comprises treating at least one surface of an aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0; applying an adhesive to the treated surface of said aluminum layer; and placing a metal layer over said adhesive to form a laminate, said metal selected from the group consisting of iron, steel, zinc, nickel, tin and copper.

11. A process which comprises depositing aluminum vapor on the surface of an organic polymeric thermoplastic film to form an aluminum layer thereon and treating the exposed surface of said aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0; applying an adhesive to the treated surface of said aluminum layer; and placing an organic polymeric thermoplastic film layer over said adhesive to form a laminate.

12. A process which comprises depositing aluminum vapor on the surface of an organic polymeric thermoplastic film to form an aluminum layer thereon and treating the exposed surface of said aluminum layer with an aqueous solution of a complex compound of the Werner type in which a trivalent nuclear chromium atom is coordinated with an acetato-containing radical selected from the group consisting of trichloroacetato, trifluoroacetato and cyanoacetato radicals, the pH of said solution being maintained at from 4.0 to 7.0; applying an adhesive to the treated surface of said aluminum layer; and placing a metal layer over said adhesive to form a laminate, said metal selected from the group consisting of iron, steel, zinc, nickel, tin and copper.

13. A laminate comprising an aluminum layer having adsorbed on at least one surface a complex compound of the Werner type in which a trivalent nuclear chromium atom is coordinated with an acetato-containing radical selected from the group consisting of trichloroacetato, trifluoroacetato and cyanoacetato radicals; an adhesive on said surface; and an organic polymeric thermoplastic film layer disposed over said adhesive.

14. A laminate as in claim 13 wherein said organic polymeric thermoplastic film is polyvinyl fluoride film.

15. A laminate as in claim 13 wherein said organic polymeric thermoplastic film is polyethylene terephthalate film.

16. A laminate as in claim 13 wherein the aluminum layer has adsorbed thereon cyanoacetato chromic chloride.

17. A laminate as in claim 13 wherein the aluminum layer has adsorbed thereon trichloroacetato chromic chloride.

18. A laminate as in claim 13 wherein the aluminum layer has adsorbed thereon trifluoroacetato chromic chloride.

19. A laminate as in claim 13 wherein the aluminum layer is in the form of an aluminum foil having a thickness no greater than 0.005".

20. A laminate comprising a base layer of an organic polymeric thermoplastic film; a vapor deposited aluminum layer disposed on said film, said aluminum layer having adsorbed on the exposed surface a complex compound of the Werner type in which a trivalent nuclear chromium atom is coordinated with an acetato-containing radical selected from the group consisting of trichloroacetato, trifluoroacetato and cyanoacetato radicals; an adhesive on said surface; and an organic polymeric thermoplastic film layer disposed over said adhesive.

21. A laminate comprising an aluminum layer having adsorbed on at least one surface a complex compound of the Werner type in which a trivalent nuclear chromium atom is coordinated with an acetato-containing radical selected from the group consisting of trichloroacetato, trifluoroacetato and cyanoacetato radicals; an adhesive on said surface; and a metal layer disposed over said adhesive, said metal selected from the group consisting of iron, steel, zinc, nickel, tin and copper.

22. A laminate as in claim 21 wherein said metal is steel.

23. A laminate comprising a base layer of an organic polymeric thermoplastic film; a vapor deposited aluminum layer disposed on said film, said aluminum layer having adsorbed on the exposed surface a complex compound of the Werner type in which a trivalent nuclear chromium atom is coordinated with an acetato-containing radical selected from the group consisting of trichloroacetato, trifluoroacetato and cyanoacetato radicals; an adhesive on said surface; and a metal layer disposed over said adhesive, said metal selected from the group consisting of iron, steel, zinc, nickel, tin and copper.

24. A laminate as in claim 23 wherein said metal is steel.

References Cited in the file of this patent

UNITED STATES PATENTS

| | | |
|---|---|---|
| 2,544,667 | Goebel et al. | Mar. 13, 1951 |
| 2,549,220 | McLaren | Apr. 17, 1951 |
| 2,662,835 | Reid | Dec. 15, 1953 |
| 2,693,458 | Olson | Nov. 2, 1954 |
| 2,764,085 | Shoemaker | Sept. 25, 1956 |